United States Patent
Kwan

(10) Patent No.: US 11,566,744 B2
(45) Date of Patent: Jan. 31, 2023

(54) STABILIZER FOR A PIPELINE INSPECTION DEVICE

(71) Applicant: Pure Technologies Ltd., Calgary (CA)

(72) Inventor: Jeffrey Chak-Fai Kwan, Mississauga (CA)

(73) Assignee: PURE TECHNOLOGIES LTD, Calagary (CA)

( * ) Notice: Subject to any disclaimer, the term of this patent is extended or adjusted under 35 U.S.C. 154(b) by 98 days.

(21) Appl. No.: 17/097,462

(22) Filed: Nov. 13, 2020

(65) Prior Publication Data

US 2021/0148504 A1 May 20, 2021

Related U.S. Application Data

(60) Provisional application No. 62/936,107, filed on Nov. 15, 2019.

(51) Int. Cl.
*F16L 55/44* (2006.01)
*F16L 101/30* (2006.01)

(52) U.S. Cl.
CPC ........... *F16L 55/44* (2013.01); *F16L 2101/30* (2013.01)

(58) Field of Classification Search
CPC ............................... F16L 55/44; F16L 2101/30
See application file for complete search history.

(56) References Cited

U.S. PATENT DOCUMENTS

| | | | | |
|---|---|---|---|---|
| 7,505,063 B1 * | 3/2009 | Bastedo | ................. | B08B 9/043 |
| | | | | 348/84 |
| 7,694,564 B2 * | 4/2010 | Brignac | ................. | F16L 55/30 |
| | | | | 73/635 |
| 2005/0223825 A1 * | 10/2005 | Janssen | ................. | F16L 55/48 |
| | | | | 73/865.8 |

* cited by examiner

*Primary Examiner* — Herbert K Roberts
*Assistant Examiner* — Anthony W Megna Fuentes
(74) *Attorney, Agent, or Firm* — Barnes & Thornburg LLP

(57) ABSTRACT

There is provided a pipeline inspection device stabilizer apparatus for use with a pipeline inspection device configured to assess the condition of a pipeline while being carried by a moving liquid in the pipeline, the device including an inspection module, the apparatus comprising a forward spacer secured in front of the inspection module and a rear spacer secured behind the inspection module, each of the front spacer and the rear spacer configured to move between a collapsed position close to the device and an outward position extending away from the device and towards the pipeline wall, wherein when in the outward position the front and rear spacers contact the pipeline wall to distance the inspection module from the pipeline wall and maintain axial alignment or substantial axial alignment of the inspection module with the longitudinal center of the pipeline.

16 Claims, 10 Drawing Sheets

STABILIZER FOR A PIPELINE INSPECTION DEVICE

REFERENCE TO RELATED APPLICATIONS

This application claims priority to U.S. Provisional application No. 62/936,107 filed Nov. 15, 2019 titled "STABILIZER FOR A PIPELINE INSPECTION DEVICE", which is incorporated herein by reference in its entirety.

TECHNICAL FIELD

The present invention relates to a stabilizer for a pipeline inspection device and methods of using same.

BACKGROUND

It is known to use various pipeline inspection devices to inspect the condition of the walls of the pipeline. In some cases, these devices are carried through the pipeline by the movement of fluid. The movement can be assisted by a drogue attached to these devices where the inflation of the drogue will cause movement of the device downstream. These devices are generally elongated and flexible so they can be inserted and retracted from the pipeline and can conform to the dimensions of the pipeline and/or to better move around the various bends and structures of the pipeline.

Some pipeline assessments may require the use of one specific type or numerous different types of inspection equipment. Therefore, these devices generally comprise one or modules comprising detection equipment configured for obtaining specific information of the condition of the pipeline. Detection equipment may include, but is not limited to optical, electromagnetic, and/or ultrasonic sensors (such as acoustic transducers).

For example, metallic wall loss can be detected using one or more transducers. The quality and/or strength of the data may depend on the orientation of the transducer in relation to the wall. In some applications, it may be preferred to obtain data from the transducer when it is substantially centralized within the interior of the pipeline. In some other applications, it may be preferable to obtain data from the transducer when the transducer is axially aligned or substantially axially aligned with the longitudinal center of the pipeline. In some embodiments, it is preferred that the transducer is within about 3% of the longitudinal center of the pipeline in order to avoid acoustic reflections from the wall from being deflected away from the receiving transducer and losing signal when the transducer is beyond this target centralization.

There is a need to provide pipeline inspection devices and methods of pipeline inspection which allow for the inspection of the entire interior surface (i.e. pipewall circumference) of the pipeline during flow conditions and which allow for the deployment in those pipelines that have various bends and inline valves while maintaining the equipment in a substantially centralized position within the interior of the pipeline.

SUMMARY OF THE INVENTION

The present disclosure relates to an apparatus and method for centralizing pipeline inspection equipment deployed into a fluid-filled pipeline.

In one embodiment, the disclosure relates to a stabilizer securable to pipeline inspection equipment configured to maintain the pipeline inspection equipment in an optimal position for assessing the condition of a pipeline when the inspection equipment is deployed into the pipeline.

In one aspect, the stabilizer keeps the pipeline inspection equipment in a substantially centralized position within the liquid containing pipeline and is configured to resist forces that would otherwise move the inspection equipment away from the substantially centralized position. In aspects, the forces acting on the equipment include, but is not limited to forces due to wobbling caused by the movement of a drogue pulling the inspection equipment, negative buoyancy causing the inspection equipment to sink, and changes in cable tension that arise when the equipment is moved around the various bends in the pipeline.

In one embodiment, there is provided a stabilizer for a pipeline inspection equipment, the stabilizer configured to maintain the pipeline inspection equipment in a position for assessing the condition of a liquid containing pipeline when the equipment is deployed into and moves within the pipeline, the stabilizer comprising: a forward member and an aft member positionable forward and aft, respectively, of the inspection equipment, each of the forward member and aft member including a spacer extendable therefrom and configured to contact the wall of the pipeline to space the equipment from the wall of the pipeline.

It is an embodiment of the present invention to provide a stabilizer for a pipeline inspection device for assessing the condition of a pipeline, the stabilizer comprising a forward spacer configured to be secured to one end of an inspection equipment; a rear spacer configured to be secured to another end of the inspection equipment, each of the forward spacer and the rear spacer is configured to move between an inward position close to the device to an outward position away from the device and towards the pipeline wall, wherein when the spacers are in the outward position and contact the pipeline wall, the spacers maintain a distance between the pipeline wall and the inspection equipment.

A stabilizer for a pipeline inspection device for assessing the condition of a pipeline, the pipeline inspection device configured to be carried by moving fluid in the pipeline and including an inspection equipment, the stabilizer comprising: a forward spacer and a rear spacer, each of the front spacer and the rear spacer is configured to move between an inward position close to the device to an outward position away from the device and towards the pipeline wall, wherein when the forward spacer and the rear spacer are in the outward position and contact the pipeline wall, the spacers distance the inspection equipment from the pipeline wall.

It is an embodiment of the present invention to provide a kit for assessing the condition a pipeline, the kit comprising: an inspection equipment; a stabilizer comprising a forward spacer securable to one end of the inspection equipment; a rear spacer securable at another end of the inspection equipment, each of the forward spacer and the rear spacer is configured to move between an inward position close to the inspection equipment to an outward position away from the inspection equipment and towards the pipeline wall, wherein when the spacers are in the outward position and contact the pipeline wall, the spacers keep the inspection equipment substantially aligned with the longitudinal center of the pipeline wall.

It is an embodiment of the present invention to provide a method of assessing the condition a pipeline using an inspection equipment, the method comprising: securing a forward spacer to the inspection equipment;

securing a rear spacer to the inspection equipment, the forward and rear spacers are configured to move between an inward position close to the device to an outward position away from the device; and deploying the forward and rear spacers and the inspection equipment into a fluid-containing pipeline such that when the spacers are moved into the outward position and towards the pipeline wall so as to contact the pipeline wall, the forward spacer and the rear spacer distance the inspection equipment from the pipeline wall to maintain the inspection equipment substantially axially aligned with the longitudinal center of the pipeline as the inspection equipment is carried by the fluid within the fluid-containing pipeline.

It is an embodiment of the present invention to provide a pipeline inspection device stabilizer apparatus for use with a pipeline inspection device configured to assess the condition of a pipeline while being carried by a moving liquid in the pipeline, the device including an inspection module, the apparatus comprising a forward spacer secured in front of the inspection module and a rear spacer secured behind the inspection module, each of the front spacer and the rear spacer configured to move between a collapsed position close to the device and an outward position extending away from the device and towards the pipeline wall, wherein when in the outward position the front and rear spacers contact the pipeline wall to distance the inspection module from the pipeline wall and maintain axial alignment or substantial axial alignment of the inspection module with the longitudinal center of the pipeline.

In one aspect, the substantial axial alignment is within about 3% of the longitudinal center of the pipeline.

In one aspect, the front spacer and the rear spacer are biased in the outward position and can be caused to move into the collapsed position upon application of a sufficient amount of inward force to overcome the bias.

In one aspect, the apparatus further comprises a forward member configured for mounting the front spacer thereto and a rear member configured for mounting the rear spacer thereto. In one aspect, the front and rear spacers comprise a plurality independently moveable whiskers secured around the circumference of the front member and the rear member. In one aspect, the whiskers are configured to pivotally move between the outward position to the collapsed position in either the forward or the rear direction. In one aspect, the whiskers are resilient along at least a portion of its length to enable the whisker to resiliently bend when contacting the pipeline wall. In one aspect, the whiskers comprise steel or fiberglass. In one aspect, there are at least 6 whiskers, 12 whiskers, or 16 whiskers.

In one aspect, the apparatus comprises a plurality of pivot arms disposed circumferentially around the forward and rear members, wherein each one of the plurality of pivotal arms is configured to secure each one of the plurality of independently moveable whiskers. In one aspect, the apparatus further comprises forward and rear push arms, forward and rear springs, and forward and rear arm pusher rings, wherein one end of each push arm is secured to the pivot arm and the other end of the push arm is secured to one of the pair of arm pusher rings, wherein forward movement of one of the plurality of independently moveable whiskers moves the pivot arm in the forward direction which causes the forward pusher arm to push the forward pusher ring to resiliently compress the forward spring and wherein rearward movement of one of the plurality of independently moveable whiskers moves the pivot arm in the rearward direction which causes the rear pusher arm to push the rear pusher ring to resiliently compress the rear spring.

In one aspect, the inspection module comprises optical, electromagnetic, and/or ultrasonic sensors. In one aspect, the inspection module is an ultrasonic inspection module configured to detect pipeline defects. In one aspect, the defects are one or more of liner delamination, ovality changes, air pockets, internal debris, and metallic wall loss.

It is an embodiment of the present invention to provide a pipeline inspection device configured to assess the condition of a pipeline while being carried by a moving liquid in the pipeline, the device comprising: an inspection module for optically, electromagnetically, and/or ultrasonically assessing the condition of the pipeline; and a pipeline inspection device stabilizer apparatus, the apparatus comprising: a forward spacer secured in front of the inspection module and a rear spacer secured behind the inspection module, each of the front spacer and the rear spacer configured to move between a collapsed position close to the device and an outward position extending away from the device and towards the pipeline wall, wherein when in the outward position the front and rear spacers contact the pipeline wall to distance the inspection module from the pipeline wall and maintain axial alignment or substantial axial alignment of the inspection module with the longitudinal center of the pipeline.

It is an embodiment of the present invention to provide a method for assessing the condition a pipeline using a pipeline inspection device configured to assess the condition of a pipeline while being carried by a moving liquid in the pipeline, the device including an inspection module, the method comprising: securing a forward spacer in front of an inspection module for optically, electromagnetically, and/or ultrasonically assessing the condition of the pipeline; securing a rear spacer to the rear of the inspection module, the forward and rear spacers are configured to move between an inward position close to the device to an outward position away from the device; and deploying the inspection module into a liquid-containing pipeline such that when the spacers are moved into the outward position and towards the pipeline wall so as to contact the pipeline wall, the forward spacer and the rear spacer distance the inspection module from the pipeline wall and maintain axial alignment or substantial axial alignment of the inspection module with the longitudinal center of the pipeline; and assessing, using the inspection module, the condition of the pipeline along the pipeline length as the device is carried through the pipeline by the moving liquid.

In one aspect, the assessing is for pipeline defects by ultrasonic detection.

DETAILED DESCRIPTION

Figure 1:
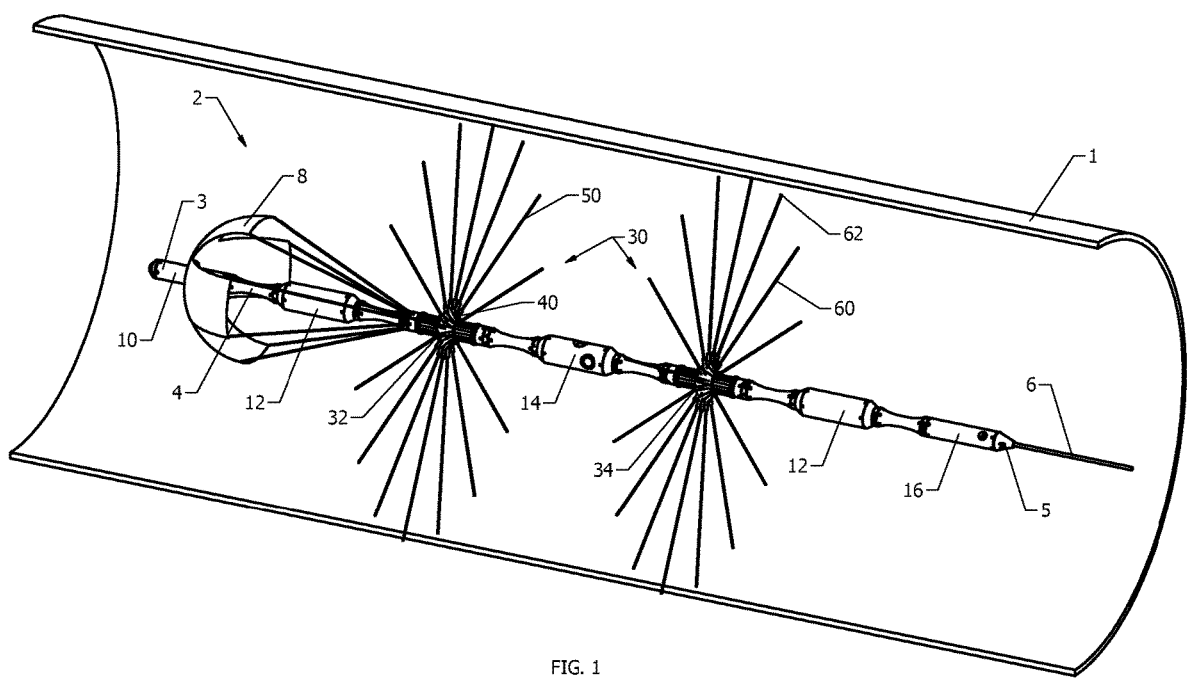
FIG. 1 is a perspective view of a pipeline inspection device deployed in a pipeline, the device comprising a drogue, various inspection equipment modules, battery modules, and a stabilizer with a forward and an aft member with spacers in an extended position, in accordance with an embodiment of the invention.

Reference will be made below in detail to exemplary embodiments of the invention, examples of which are illustrated in the accompanying drawings. Wherever possible, the same reference numerals used throughout the drawings refer to the same or like parts.

FIG. 1 shows a pipeline inspection device 2 that is deployable into a pipeline 1 to assess the condition of the wall of pipeline. The pipeline 1 may contain fluid (not shown for illustration purposes) and can be partially or completely filled with the fluid (such as a liquid). The liquid can be flowing or non-moving depending on the application. Generally, the device 2 comprises a forward portion 3 and a rear portion 5 opposite of the forward portion 3. The terms "forward" and "rear" are used solely for convenience and to establish some directional reference in relation to the direction of movement of the device 2 in the pipeline.

Figure 2:
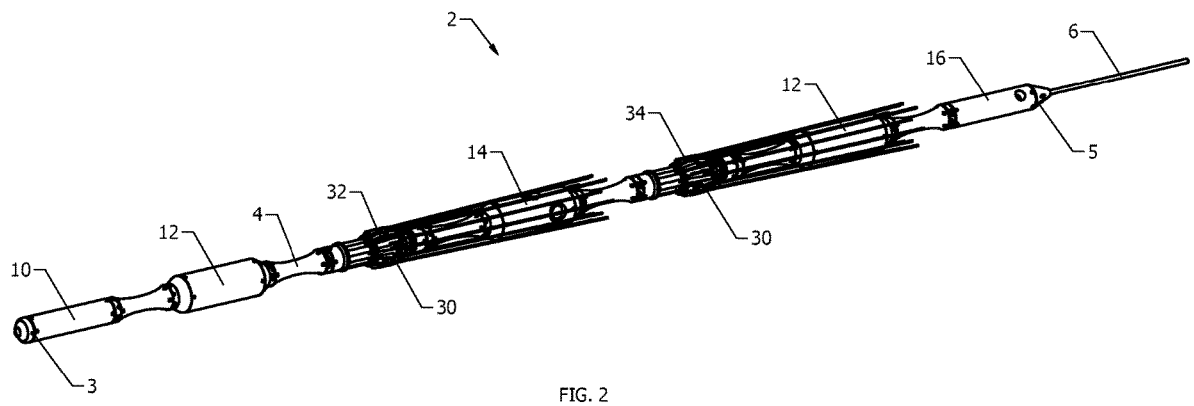
FIG. 2 is a perspective view of a pipeline inspection device deployed in a pipeline, the device comprising various inspection equipment modules, battery modules, and stabilizer with forward and aft member with spacers in a collapsed position and pivoted towards the rear direction, in accordance with an embodiment of the invention.

With reference to FIG. 2, device 2 comprises one or more modules 10, 12, 14, and 16 between the forward portion 3 and the rear portion 5. The drogue 8 has been omitted for illustration purposes. Modules 10, 12, 14, and 16 may comprise any type of inspection equipment 20 useful for collecting information about the condition of the pipeline, specifically, this inspection equipment 20 may be useful for collecting information about various defects in the wall of the pipeline, such defects include, for example, metallic wall loss. In aspects, the inspection equipment 20 collects pipeline condition assessment information such as liner delamination, ovality changes and air pockets and internal debris.

Device 2 may include any number of modules and each of modules 10, 12, 14, and 16 can contain similar equipment or different equipment, depending on the desired application. For example, module 10 and/or 14 can include sensory equipment for collecting any one or all of optical, acoustic, and magnetic information useful for assessing the condition of the pipeline, module 16 can comprise video and fiber optic components, and module 12 can comprise battery and/or buoyancy components that allow the device 2 to remain buoyant in the liquid containing pipeline and/or to house various electrical components to control and drive any components in module 10 and/or module 14 of device 2.

A cable 6 is coupled to the rear section 5 and is configured to tether the device 2 to an external location (not shown) outside of the pipeline when the device 2 is deployed inside the pipeline. Cable 6 may also be configured to carry electrical and/or fiber optic signals from one or more of the modules 10, 12, 14, and 16 to the external location and/or deliver electrical power to one or more of the modules 10, 12, 14, and 16. In some embodiments, while cable 6 is configured to have some flexibility, cable 6 can be configured to have some torsional rigidity so that cable 6 is be able to resist twisting or rotation. Cable 6 may be configured to withstand the application of significant axial and torsional forces before breaking. Such a cable 6 will have a high breaking strength so that if the device 2 encounters and obstruction or is snagged, the operator may be able to apply a significant amount of force needed retract the device 2 before causing break. In one aspect, one or more axial loading members (such as for example, aramid or kevlar cord, not shown) may be associated with cable 6 for increasing the breaking (tensile) strength are provided.

A drogue 8 is coupled at around the forward portion 3 and is configured to inflate upon deployment into the liquid containing pipeline. Inflation of the drogue 8, caused by the moving liquid, causes the drogue 8 to pull the device in the direction of the flow of the liquid.

When a plurality of modules 10, 12, and 14 are used, the modules 10, 12, and 14 are connected to each other via connecting member (or joint) 4 which is configured to have some flexibility so that the modules 10, 12, 14, and 16 of the device 2 can bend in relation to each other such that the device 2 can conform to the various bends of the pipeline that may be encountered during the deployment. The connecting member 4 may also be configured to have some torsional rigidity to resist twisting of modules 10, 12, 14, and 16 in relation to each other. The connecting member 4 defines one or more internal passages (not shown) which are dimensioned to carry cabling (not shown), including for example, electrical cables for transmitting electronic signals between the plurality of modules 10, 12, 14, and 16 and/or power cables for carrying electrical power from the external location to the plurality of modules 10, 12, 14, and 16.

Device 2 includes at least one stabilizer 30 comprising a forward member 32 and an aft member 34. Each of the forward and aft members 32, 34 comprise a tube 40 and each tube 40 comprises a spacer 50 extendable away from the tube 40 and configured so that the spacer 50 is able to contact the wall of the pipeline when in an extended position to distance the device 2 and the inspection equipment 20 from the wall of the pipeline 1. When the forward member 32 is positioned forward and the aft member 34 is positioned aft of the inspection equipment 20 and the spacer 50 is caused to be in the extended position, this arrangement will not only keep the device 2 and the inspection equipment 20 positioned in the longitudinal center of the pipeline 1 or substantially in the longitudinal center of the pipeline 1, but the arrangement will also be able to resist lateral forces acting on the module from the drogue wobble, negative buoyancy and cable tension.

In some embodiments, the stabilizer 30 axially aligns or substantially axially aligns the device 2 and the inspection equipment 20 with the longitudinal center of the pipeline 1. In some embodiments, the inspection equipment is an acoustic transducer and in preferred embodiments the stabilizer 30 maintains acoustic transducers within about 3% of the longitudinal center of the pipeline in order to avoid acoustic reflections from the wall from being deflected away from the receiving transducer and losing signal.

The spacer 50 is configured to be retractable from the extended position to a collapsed position where the spacer 50 is close to the tube 40. In some embodiments, the spacer 50 is configured so that in the collapsed position the spacer 50 does not increase or significantly increase the overall width (as compared to existing modules 10, 12, 14, and 16 which are about 2.25" in diameter) and therefore, in this position, the spacer 50 is to be able to be used various applications that require movement within existing pipeline insertion sleeves, or the ability to pass standard access valves, pipe joints and open laterals.

In the embodiment shown in FIGS. 1 to 9, the tube 40 is an elongate hollow tubular structure having a first end 42 and a second end 44. First and second ends 42, 44 are configured to couple with adjacent modules 10, 12, 14, and or 16 using for example, a standard 1.5" connection to allow for a modular design. The first and second ends 42, 44 may be separate pieces to be secured to the tube 40 using screws 46 and one or more seals 48 (e.g. o-rings) are provided to keep the interior of the tube 40 dry. In one aspect, the tube 40 is about 6.6" in length from the first 42 to the second end 44. The tube 40 is dimensioned to allow the passage of various connectors and wires to pass therethrough (not shown). As will be detailed below, the tube 40 includes one or more features configured for moveably mounting the spacers 50.

With reference to the embodiment as shown in FIGS. 1 to 10, and more particularly to FIGS. 3 to 10, spacer 50 comprises sixteen (12) stainless steel wire whiskers 60 secured around the circumference of the tube 40. Each whisker 60 is moveably secured to the tube 40 so that each one whisker 60 can independently move from the extended position to the collapsed position where the whiskers 60 are aligned substantially parallel to the body. In one aspect, the spacers 50 are understood to have bi-directional movement because the whiskers 60 can pivot either in the forward or aft direction. In aspects, the movement of the whiskers 60 is spring-loaded in that in the whiskers 60 (and thus the spacers 50) are biased into the extended position but can move to the collapsed position upon the application of a sufficient amount of force. Whiskers 60 can vary in any number of sufficient to space the inspection equipment 20 from the wall of the pipeline 1 and axially align or substantially axially align the device 2 and the inspection equipment 20 with the longitudinal center of the pipeline 1. In aspects, each spacer 50 can include six or more individual whiskers 60. In some aspects, each spacer 50 can include 12 or 16 whiskers 60.

In aspects, each one whisker 60 is a substantially elongate rigid structure configured to have some resiliency along at least a portion of its length so that it can bend and then unbend. Whiskers 60 should also have a sufficient length so that a tip 62 of the whisker 60 can contact the wall of the pipeline 1 when the whiskers 60 are extended away from the tube 40, and the spacer 50 assumes the extended position. In some embodiments, whisker 60 comprises 302 spring tempered stainless steel wire or fiberglass.

Each whisker 60 is secured to a pivot arm 70 that is pivotably connected, by a spring pin 72, to a hinge tab 74. In one aspect, each whisker 60 is threaded into the pivot arm 70. Each hinge tab 74 is secured to a recessed slot 76 formed in the circumference of the tube 40. Two hinge tab retainer rings 78 encircle the circumference of the tube 40 and are provided on either flank of a plurality of hinge tabs 74 and the recessed slots 76 and are configured to reduce unintended translational movement of the hinge tab 74 along the longitudinal axis of the tube 40. A pair of retainer rings 80 encircle the circumference of the tube 40 are used to secure the hinge tab retainer rings 78. In aspects, the retainer rings 80 can be spiral retainer rings 80.

A pair of push arms 82 are provided where each push arm 82 has one end 84 that is moveably secured to the pivot arm 70 and another end 86 that is moveably secured to an arm pusher ring 90 encircling the circumference of the tube 40.

Arm pusher ring 90 (of which there is one pair) is substantially circular and defines a plurality of guide apertures 92 suitably dimensioned for receiving a guide rod 110 and a plurality of pusher ring stopper pin apertures 94 suitably dimensioned for receiving a pusher ring stopper pin 96 (as described below).

In some embodiments, there is provided a pair of arm pusher ring covers 98 which may be useful during assembly and for machinability purposes, and wherein each arm pusher ring cover 98 includes a plurality of pusher ring stopper pins apertures 100.

A pair of pusher rings 102 encircle the circumference of the tube 40 and include a plurality of guide apertures 104. Pusher ring stopper pins 96 are seated along two rows around the circumference of the tube 40. Pusher ring stopper pins 96 are configured to abut against the pusher ring 102 and limit the longitudinal movement (inward towards the center of the tube 40) of the pusher ring 102 from moving beyond the pusher ring stopper pins 96.

In one embodiment, a compression spring 108 is wrapped around the guide rod 110 and is provided between pusher ring 102 and the ends 42, 44 of the tube 40. One end 112 of the compression spring 108 abuts against pusher ring 102 and the other end 114 is seated in a spring pocket 116 formed at the ends 42, 44 of the tube 40 to secure the spring 108 therein. Compression spring 108 may be adapted to bottom out when the whiskers 60 are moved into a fully collapsed position. According to one embodiment, spring force can be modified using different sizes of spring with varying spring forces or adjusting the number of springs. In some embodiments, changes to the length of compression spring 108 and/or travel of the spring 108 can be made to adjust to any particular application and dimension of pipeline 1 or any pipeline associated structures.

Figure 3:
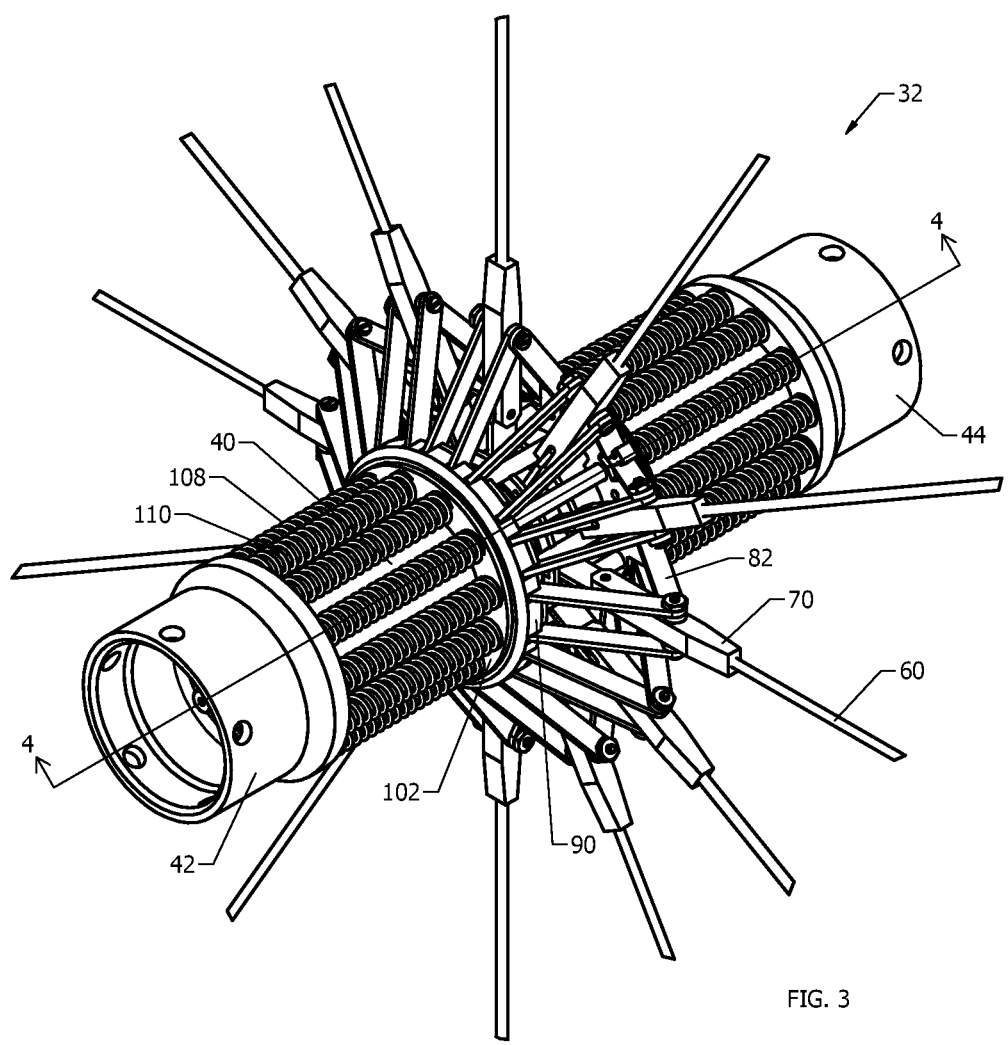
FIG. 3 is an enlarged perspective view of the forward member with its spacers in the extended position, in accordance with an embodiment of the invention.
Figure 4:
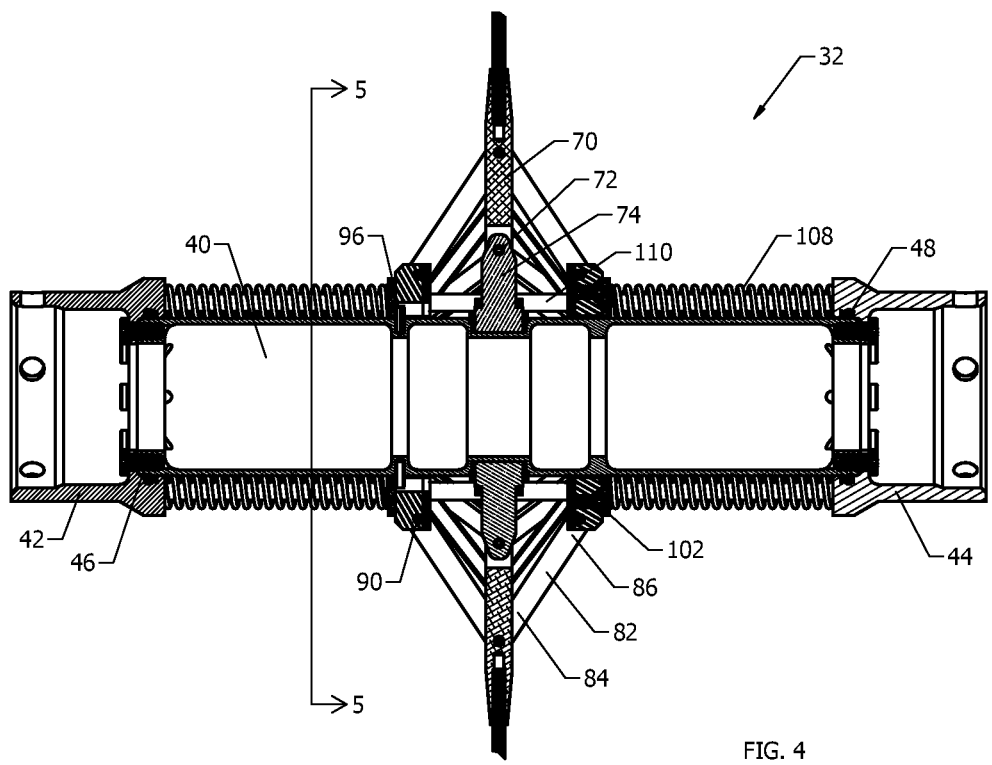
FIG. 4 is a cross sectional view the forward member along the line 4-4 in FIG. 3, in accordance with an embodiment of the invention.
Figure 5:
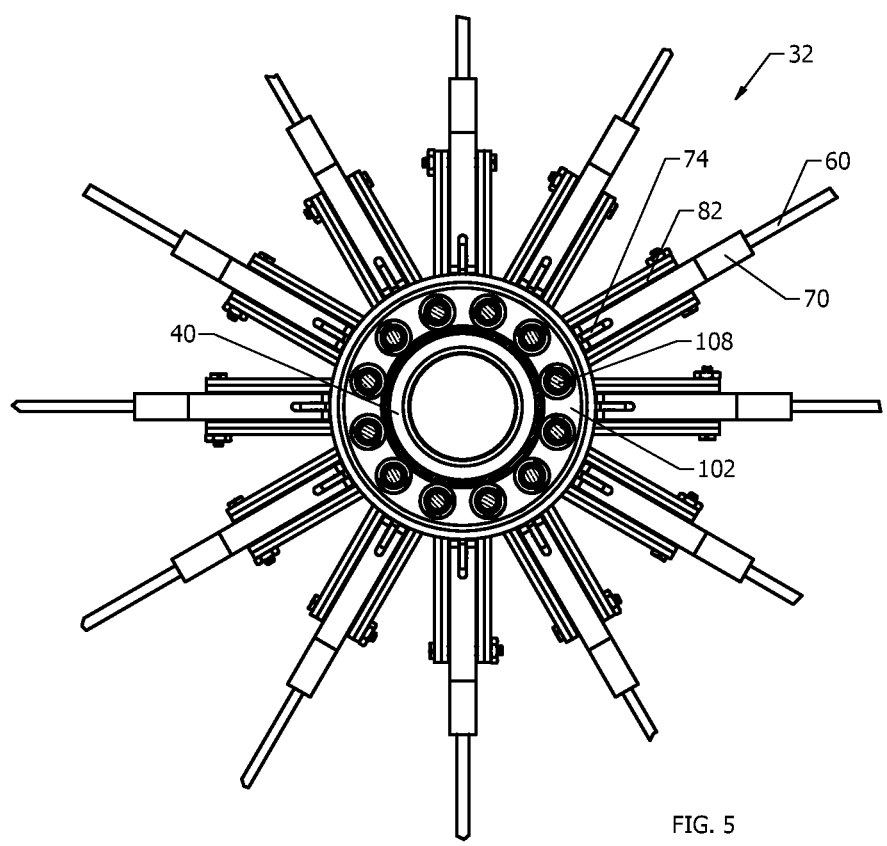
FIG. 5 is a cross sectional view the forward member along the line 5-5 in FIG. 4, in accordance with an embodiment of the invention.
Figure 6:
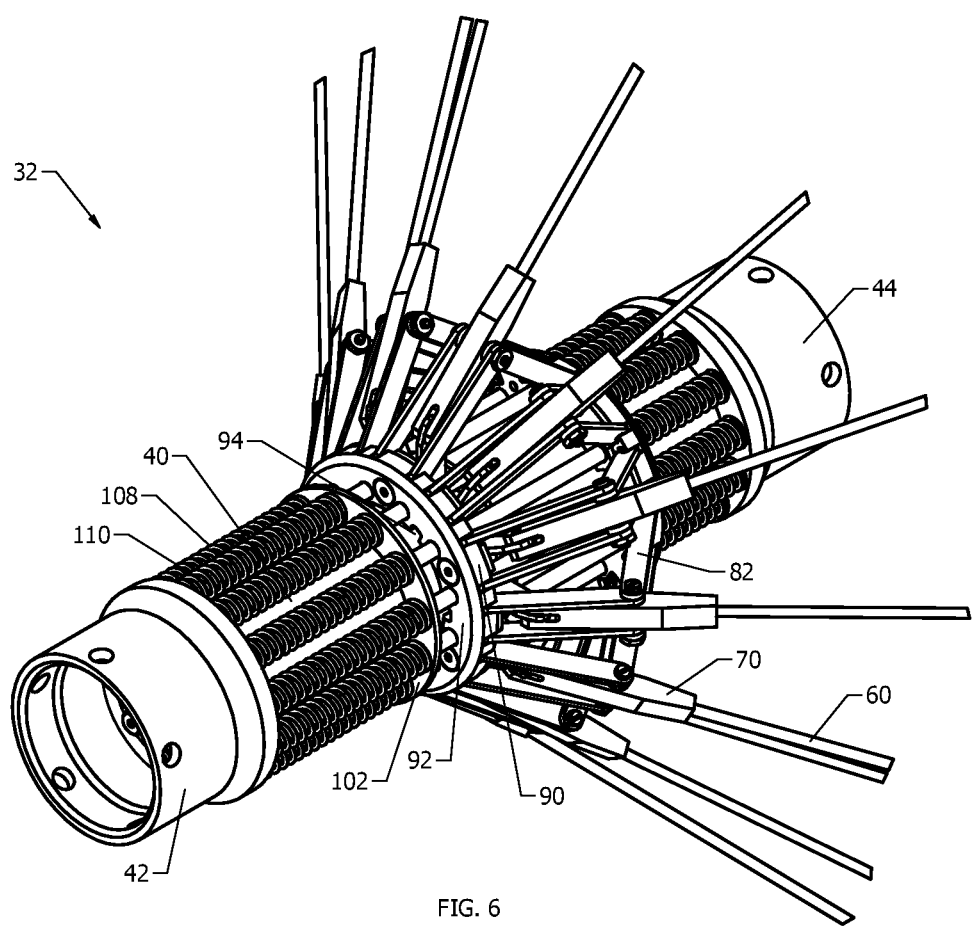
FIG. 6 is an enlarged perspective view of the forward member with its spacers in the partially collapsed position, in accordance with an embodiment of the invention.
Figure 7:
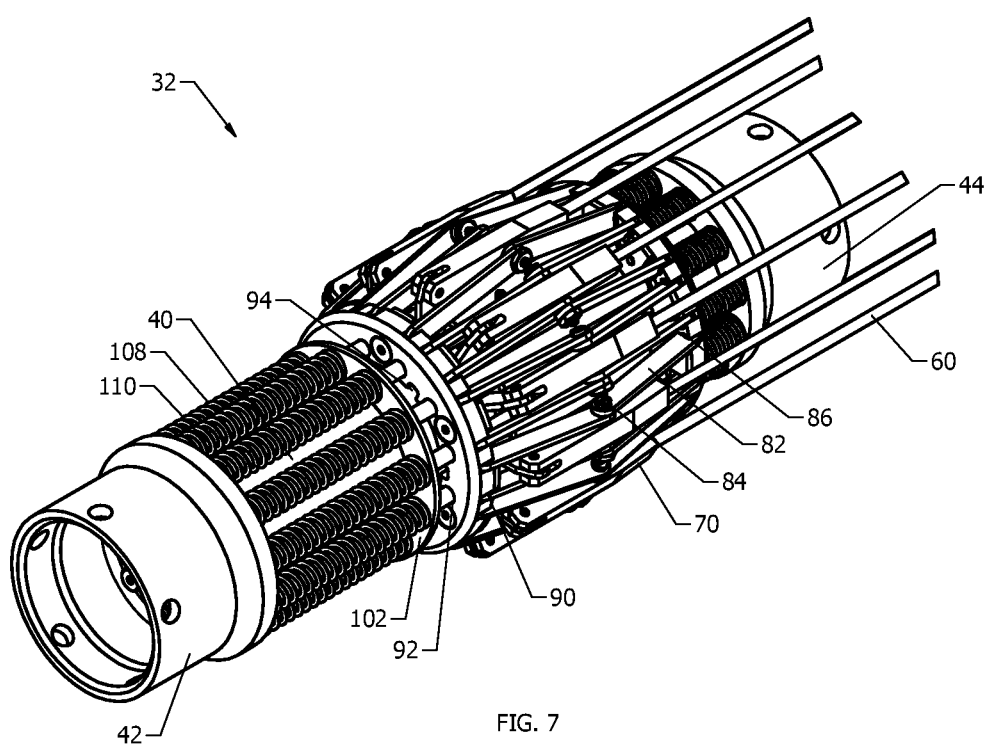
FIG. 7 is an enlarged perspective view of the forward member with its spacers in the collapsed position, in accordance with an embodiment of the invention.
Figure 8:
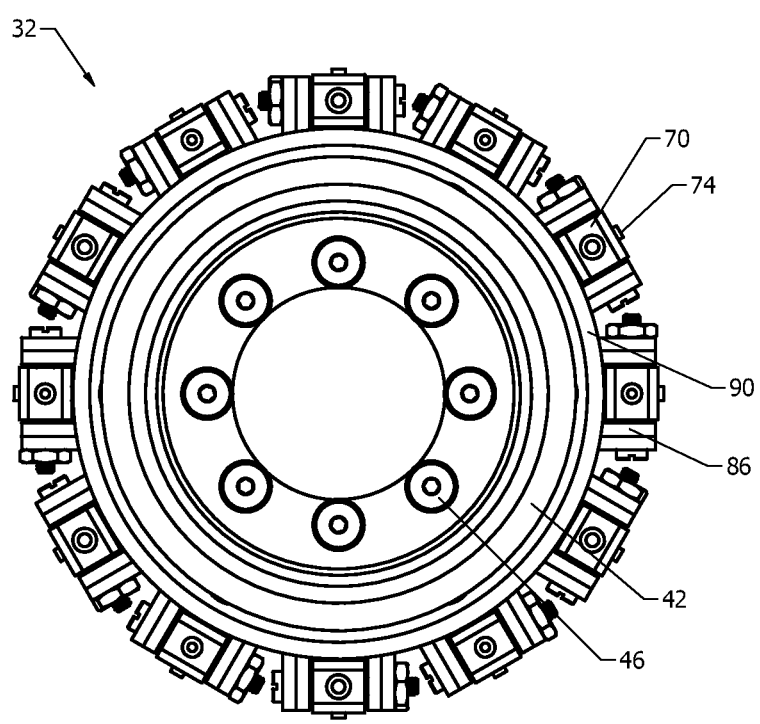
FIG. 8 is a front view of the forward member with its spacers in the collapsed position, in accordance with an embodiment of the invention.
Figure 9:
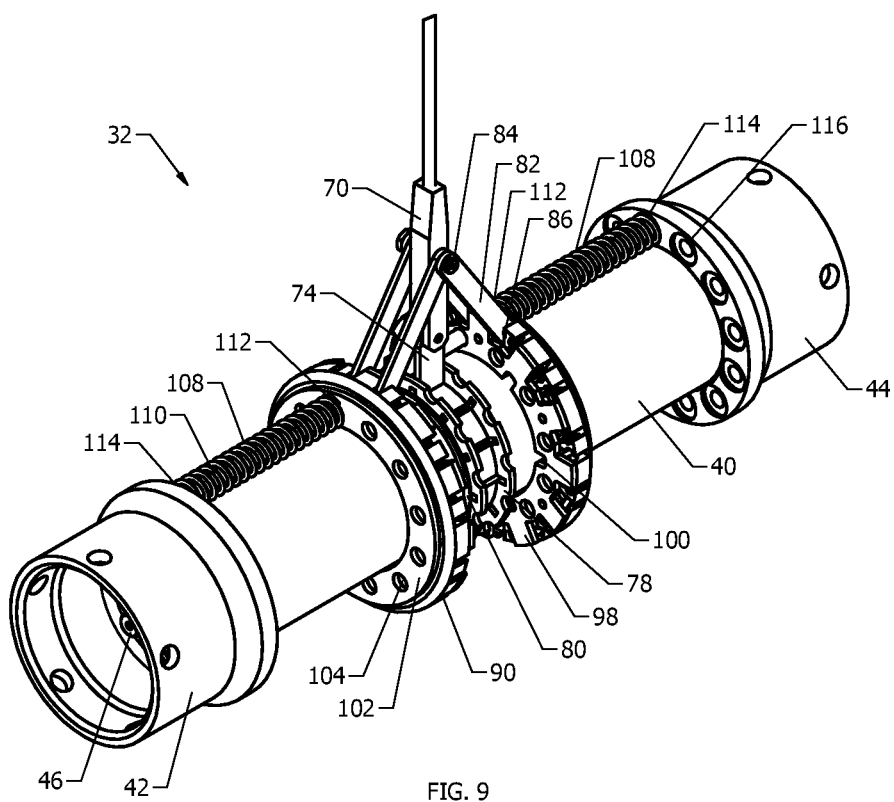
FIG. 9 is an enlarged perspective view of the forward member showing only one whisker in the extended position for illustration purposes, in accordance with an embodiment of the invention.
Figure 10:
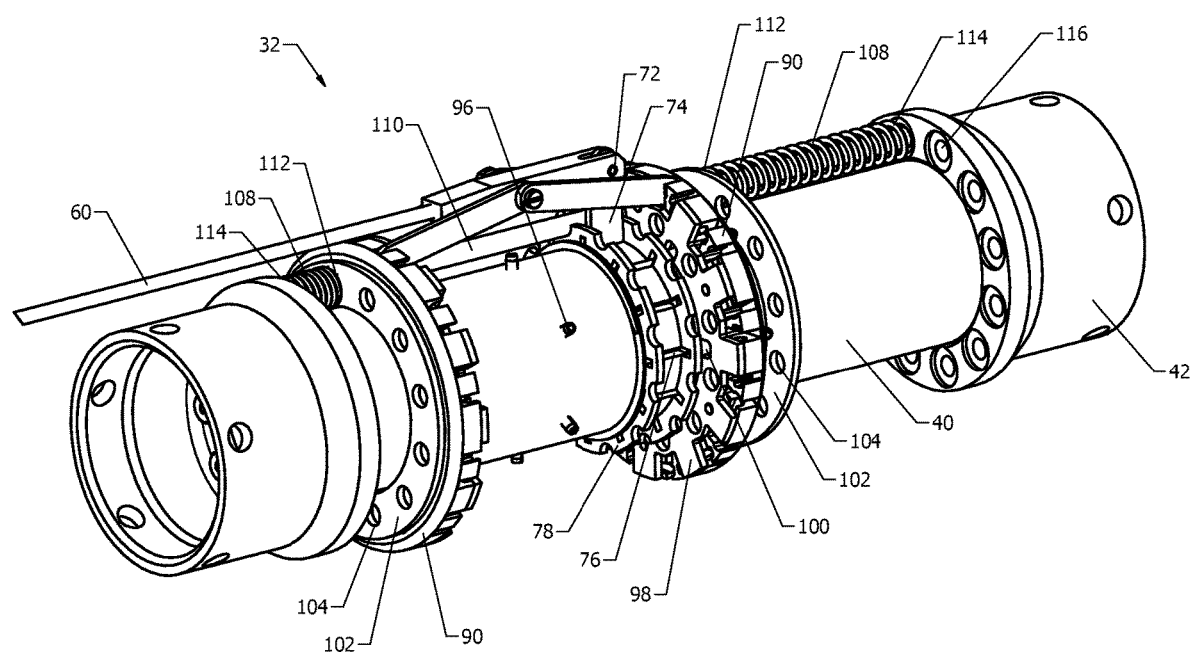
FIG. 10 is an enlarged perspective view of the forward member with showing only one whisker in the collapsed position for illustration purposes, in accordance with an embodiment of the invention.

With reference to FIGS. 3 to 10, at rest when no external force is applied to the spacer 50, the spacer 50 will assume the extended position with whiskers 60 arranged at a substantially vertical position (as shown in FIGS. 3, 4, and 8). Upon the application of an external force to a portion of the spacer 50 (either in the forward or aft direction) sufficient to move the pivot arm 70, the pivot arm 70 will pivot about the spring pin 72 and cause one of the pair of the arm pusher rings 90 to move outwardly (away from the center of the tube 40) and towards one end (e.g. end 44) of the tube 40 (as shown in FIG. 5). The guide rod 110 guides the outward longitudinal movement of the arm pusher rings 90. This outward movement will bring the arm pusher ring 90 closer to the pusher ring 102 until it abuts against the pusher ring 102. Since the arm pusher ring 90 includes stopper pins apertures 94 that are aligned with pusher ring stopper pins 96 on the tube 40, the arm pusher ring 90 will be able to clear the pusher ring stopper pins 96 and will be able to continue its outward movement to push against the pusher ring 102 which then forces the compression of the compression spring 108. When the compression ring 108 is bottomed out (i.e. fully compressed), the spacer 50 will have assumed the collapsed position.

Upon the removal of the applied force, the compression spring 108 will decompress and this will allow the pusher ring 102 to move back towards the pusher ring stopper pins 96 and the center of the tube 40. Movement of the pusher ring 102 will cease when it abuts against the pusher ring stopper pins 96 and the whiskers 60 assume the substantially vertical position.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

The invention claimed is:

1. A pipeline inspection device stabilizer apparatus for use with a pipeline inspection device configured to assess the condition of a pipeline while being carried by a moving liquid in the pipeline, the device including an inspection module, the apparatus comprising:
   a forward spacer secured in front of the inspection module;
   a rear spacer secured behind the inspection module, each of the front spacer and the rear spacer configured to move between a collapsed position close to the device and an outward position extending away from the device and towards the pipeline wall, wherein when in the outward position the front and rear spacers contact the pipeline wall to distance the inspection module from the pipeline wall and maintain axial alignment or substantial axial alignment of the inspection module with the longitudinal center of the pipeline;
   a forward member configured for mounting the front spacer thereto;
   an aft member configured for mounting the rear spacer thereto;
   wherein the front and rear spacers comprise a plurality of independently moveable whiskers secured around the circumference of the front member and the aft member, wherein the plurality of independently moveable whiskers are configured to pivotally move between the outward position to the collapsed position in either the forward or the rear direction;
   a plurality of pivot arms disposed circumferentially around the forward and aft members, wherein each one of the plurality of pivot arms is configured to secure each one of the plurality of independently moveable whiskers; and
   forward and rear push arms, forward and rear springs, and forward and rear arm pusher rings, wherein one end of each push arm is secured to the pivot arm and the other end of the push arm is secured to one of the pair of arm pusher rings, wherein forward movement of one of the plurality of independently moveable whiskers moves the pivot arm in the forward direction which causes the forward pusher arm to push the forward pusher ring to resiliently compress the forward spring and wherein rearward movement of one of the plurality of independently moveable whiskers moves the pivot arm in the rearward direction which causes the rear pusher arm to push the rear pusher ring to resiliently compress the rear spring.

2. The apparatus of claim 1, wherein the substantial axial alignment is within about 3% of the longitudinal center of the pipeline.

3. The apparatus of claim 1, wherein the front spacer and the rear spacer are biased in the outward position and are caused to move into the collapsed position upon application of a sufficient amount of inward force to overcome the bias.

4. The apparatus of claim 1, wherein the plurality of independently moveable whiskers are resilient along at least a portion of theft length to enable each one of the plurality of independently moveable whiskers to resiliently bend when contacting the pipeline wall.

5. The apparatus of claim 4, wherein the plurality of independently moveable whiskers comprise steel or fiberglass.

6. The apparatus of claim 1, wherein the plurality of independently moveable comprise at least 6 whiskers, 12 whiskers, or 16 whiskers.

7. The apparatus of claim 1, wherein the inspection module comprises optical, electromagnetic, and/or ultrasonic sensors.

8. The apparatus of claim 7, wherein the inspection module is an ultrasonic inspection module configured to detect pipeline defects.

9. The apparatus of claim 8, wherein the pipeline defects are one or more of liner delamination, ovality changes, air pockets, internal debris, and metallic wall loss.

10. A pipeline inspection device configured to assess the condition of a pipeline while being carried by a moving liquid in the pipeline, the device comprising:
   an inspection module for optically, electromagnetically, and/or ultrasonically assessing the condition of the pipeline; and
   a pipeline inspection device stabilizer apparatus, the apparatus comprising:
      a forward spacer secured in front of the inspection module and a rear spacer secured behind the inspection module, each of the front spacer and the rear spacer configured to move between a collapsed position close to the device and an outward position extending away from the device and towards the pipeline wall, wherein when in the outward position the front and rear spacers contact the pipeline wall to distance the inspection module from the pipeline wall and maintain axial alignment or substantial axial alignment of the inspection module with the longitudinal center of the pipeline;
      a forward member configured for mounting the front spacer thereto;
      an aft member configured for mounting the rear spacer thereto;
      wherein the front and rear spacers comprise a plurality of independently moveable whiskers secured around the circumference of the front member and the aft member, wherein the plurality of independently moveable whiskers are configured to pivotally move between the outward position to the collapsed position in either the forward or the rear direction;
      a plurality of pivot arms disposed circumferentially around the forward and aft members, wherein each one of the plurality of pivot arms is configured to secure each one of the plurality of independently moveable whiskers; and forward and rear push arms, forward and rear springs, and forward and rear arm pusher rings, wherein one end of each push arm is secured to the pivot arm and the other end of the push arm is secured to one of the pair of arm pusher rings, wherein forward movement of one of the plurality of independently moveable whiskers moves the pivot arm in the forward direction which causes the forward pusher arm to push the forward pusher ring to resiliently compress the forward spring and wherein rearward movement of one of the plurality of independently moveable whiskers moves the pivot arm in the rearward direction which causes the rear pusher arm to push the rear pusher ring to resiliently compress the rear spring.

11. The device of claim 10, wherein the substantial axial alignment is within about 3% of the longitudinal center of the pipeline.

12. The device of claim 10, wherein the front spacer and the rear spacer are biased in the outward position and are caused to move into the collapsed position upon application of a sufficient amount of inward force to overcome the bias.

13. A method for assessing the condition a pipeline using a pipeline inspection device configured to assess the condition of a pipeline while being carried by a moving liquid in the pipeline, the device comprising an inspection module and a pipeline inspection device stabilizer apparatus, the apparatus comprising:
- a forward spacer secured in front of the inspection module and a rear spacer secured behind the inspection module, each of the front spacer and the rear spacer configured to move between a collapsed position close to the device and an outward position extending away from the device and towards the pipeline wall, wherein when in the outward position the front and rear spacers contact the pipeline wall to distance the inspection module from the pipeline wall and maintain axial alignment or substantial axial alignment of the inspection module with the longitudinal center of the pipeline;
- a forward member configured for mounting the front spacer thereto;
- an aft member configured for mounting the rear spacer thereto;
- wherein the front and rear spacers comprise a plurality independently moveable whiskers secured around the circumference of the front member and the aft member, wherein the plurality independently moveable whiskers are configured to pivotally move between the outward position to the collapsed position in either the forward or the rear direction;
- a plurality of pivot arms disposed circumferentially around the forward and aft members, wherein each one of the plurality of pivot arms is configured to secure each one of the plurality of independently moveable whiskers; and
- forward and rear push arms, forward and rear springs, and forward and rear arm pusher rings, wherein one end of each push arm is secured to the pivot arm and the other end of the push arm is secured to one of the pair of arm pusher rings, wherein forward movement of one of the plurality of independently moveable whiskers moves the pivot arm in the forward direction which causes the forward pusher arm to push the forward pusher ring to resiliently compress the forward spring and wherein rearward movement of one of the plurality of independently moveable whiskers moves the pivot arm in the rearward direction which causes the rear pusher arm to push the rear pusher ring to resiliently compress the rear spring, the method comprising:
- deploying the device into a liquid-containing pipeline such that when the spacers are moved into the outward position and towards the pipeline wall so as to contact the pipeline wall, the forward spacer and the rear spacer distance the inspection module from the pipeline wall and maintain axial alignment or substantial axial alignment of the inspection module with the longitudinal center of the pipeline; and
- assessing, using the inspection module, the condition of the pipeline along the pipeline length as the device is carried through the pipeline by the moving liquid.

14. The method of claim 13, wherein the assessing is for pipeline defects by ultrasonic detection.

15. The method of claim 14, wherein the pipeline defects are one or more of liner delamination, ovality changes, air pockets, internal debris, and metallic wall loss.

16. The method of claim 15, wherein the substantial axial alignment is within about 3% of the longitudinal center of the pipeline.

* * * * *